United States Patent
Butikofer et al.

(10) Patent No.: US 8,850,434 B1
(45) Date of Patent: Sep. 30, 2014

(54) SYSTEM AND METHOD OF CONSTRAINING AUTO LIVE MIGRATION OF VIRTUAL MACHINES USING GROUP TAGS

(75) Inventors: Joshua Marshall Butikofer, Lehi, UT (US); Douglas Reed Wightman, Salt Lake City, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 174 days.

(21) Appl. No.: 13/618,896

(22) Filed: Sep. 14, 2012

(51) Int. Cl.
*G06F 9/455* (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 2009/0070771 A1* | 3/2009 | Yuyitung et al. | 718/105 |
| 2013/0227144 A1* | 8/2013 | Saito et al. | 709/226 |
| 2013/0322441 A1* | 12/2013 | Anumala | 370/390 |

* cited by examiner

*Primary Examiner* — Emerson Puente
*Assistant Examiner* — Dong Kim

(57) ABSTRACT

Disclosed herein are systems, methods, and non-transitory computer-readable storage media for constraining auto live migration of virtual machines using group tags, access control lists, and time constraints. A system assigns a hypervisor a group tag denoting membership in a group and assigns a virtual machine an affinity group tag that denotes a placement requirement on hypervisors. The affinity group tag can be positive, requiring a match, or negative, requiring a non-match. The system migrates the virtual machine to the hypervisor according to compatibility between the group tag and the affinity group tag. Limitations of virtual machine placement and live migration due to group tags can be overridden in the system by a forced migration triggered by a human or qualifying event. Additionally, an access control list can be added to group membership of hypervisors and a time dimension can be added to a group tag or an access control list.

20 Claims, 5 Drawing Sheets

SYSTEM AND METHOD OF CONSTRAINING AUTO LIVE MIGRATION OF VIRTUAL MACHINES USING GROUP TAGS

BACKGROUND

1. Technical Field

The present disclosure relates to migration of virtual machines and more specifically to constraining auto live migration of virtual machines using group tags, time constraints, and an access control list.

2. Introduction

A virtual machine is a software implementation of a computer that operates like a physical machine and can be managed by a hypervisor, as a guest. Multiple virtual machines can be installed on a single physical computer managed by a single hypervisor. A hypervisor is a hardware virtualization technique that allows multiple operating systems (guests) to run concurrently on a host computer and is commonly installed on server hardware. The hypervisor manages the operating system of the guest (that can also act as a server) and provides a virtual operating platform for one or more virtual machines. Advantages of utilizing virtual machines are that multiple operating systems can co-exist on the same computer (in complete isolation from each other) and a virtual machine can use an instruction set different than the real machine. For example, a computer programmer could benefit from having multiple operating systems installed on one machine; a Linux-based OS for ease of application development and a Windows OS dedicated for non-development tasks.

Live migration of a guest virtual machine refers to moving a virtual machine from one hypervisor to another without interrupting the functioning of the virtual machine. Due to load balancing, existing policies, or for other reasons it is necessary to migrate virtual machines between hypervisors. Live migration can occur between any two host hypervisors that are compatible. Compatibility is defined by the virtualization technology being used or the CPU architectures shared between hypervisors. For example, only host hypervisors of the same CPU architecture can migrate live virtual machines between one another.

Currently, live migration can occur between any two compatible hypervisors allowing different types of virtual machines to reside on the same hypervisor. Users of virtual machines and auto live migration often wish to automatically restrict live migration to only include a subset of hypervisors for different types of virtual machines for a period of time, or to control access using an access control list; which is not possible with the current state of the art.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for constraining auto live migration of virtual machines using group tags, access control lists, and time constraints. A system constraining auto live migration of virtual machines using group tags assigns a hypervisor a group tag denoting membership in a group. The system can further associate a time constraint with the tags assigned to the hypervisor. The system can further associate an access control list with the hypervisor. The system can further associate a time constraint with the access control list. The system can assign a virtual machine an affinity group tag that denotes a placement requirement or preference on hypervisors. The affinity group tag can be positive or negative. A positive affinity group tag denotes a requirement that the virtual machine only be placed on hypervisors with a matching group tag. A negative affinity group tag denotes a requirement that the virtual machine only be placed on hypervisors without a matching group tag. The system can migrate the virtual machine to a hypervisor according to compatibility between the group tag of the hypervisor and the affinity group tag of the virtual machine, taking into account the access control list and any time constraints.

Group tags assigned to a hypervisor can be added or removed at any time and a hypervisor can belong to multiple groups at the same time. One or more tags assigned to hypervisors can have associated with them a time period, constraining that hypervisor's membership, or an access control list constraining which virtual machines can run on the hypervisor during that time period, regardless of matching tags. Affinity group tags assigned to virtual machines can be assigned at initial creation and can be added and removed after virtual machine creation. Adding an affinity group tag to a virtual machine that renders its hypervisor invalid will optionally cause the virtual machine to be automatically moved. The violating virtual machine can also be moved at a scheduled time or when an event occurs. Limitations of virtual machine placement and live migration due to group tags can be overridden in the system by forced migrations triggered by a human or qualifying event in the placement engine. Reservation access control lists can be used to enforce auto live migration and placement.

Constraining auto live migration of virtual machines using group tags can be useful in many ways. For example, consider an organization wishing to reduce their operating system (OS) licensing costs. Some OS vendors charge customers per the number of hypervisors that are hosting virtual machines using their OS. Keeping the number of hypervisors that are able to run virtual machines with this OS to a minimum will reduce the organization's licensing costs. VMs that are running this OS should therefore only auto live migrate to the smaller group of hypervisors allowed for this particular OS. Migrating to other hypervisors is possible, but would increase the overall number of hypervisors hosting virtual machines with that OS, thus increasing licensing costs. Utilizing tags on hypervisors and virtual machines limits auto live migrations for virtual machines to approved hypervisors, which can keep licensing costs to a minimum.

Consider another example where an organization has two business units that are running their virtual machines on the same set of hypervisors. Business Unit A must adhere to government regulations, preventing it from placing its virtualized workload on a hypervisor with workload from any other business unit, including Business Unit B. Business Unit A's workload needs, however, spike during the day, but are minimal at night. During the night, Business Unit A does not need as many hypervisors because of the reduced workload demand. Utilizing group tags with both an associated time period and access control list, we can assign many hypervisors to Unit A during the day (7:00 am-8:00 pm), ensuring restricted placement and live migration, but have those hypervisors be returned to Unit B at 8:00 pm. Unit B can now migrate and place virtual machines on those released hypervisors until the morning, after which the migration engine will move the virtual machines off to make room for Unit A's daily workload.

Another example is an organization with many users and where certain resources need to be reserved for user A. User A may need to have virtual machines that are able to migrate to any available hypervisor with compatible group tags and in addition have certain resources that are only available to User A's virtual machines. The reservation access control lists (ACL) of User A's reserved hypervisors are set up to only allow access to User A's virtual machines. User A's virtual machines can now migrate to any compatible hypervisor and are the only virtual machines that are allowed to migrate to the reserved hypervisors. A person skilled in the art will recognize situations in which assigning the access control list and the affinity groups tags time constraints will be useful.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for constraining auto live migration of virtual machines using group tags, time constraints, and access control lists (ACL). A system, method and non-transitory computer-readable media are disclosed which constrain auto live migration of virtual machines using group tags. A brief introductory description of a basic general purpose system or computing device in FIG. 1 which can be employed to practice the concepts is disclosed herein. A more detailed description of constraining auto live migration of virtual machines using group tags will then follow.

Figure 1:
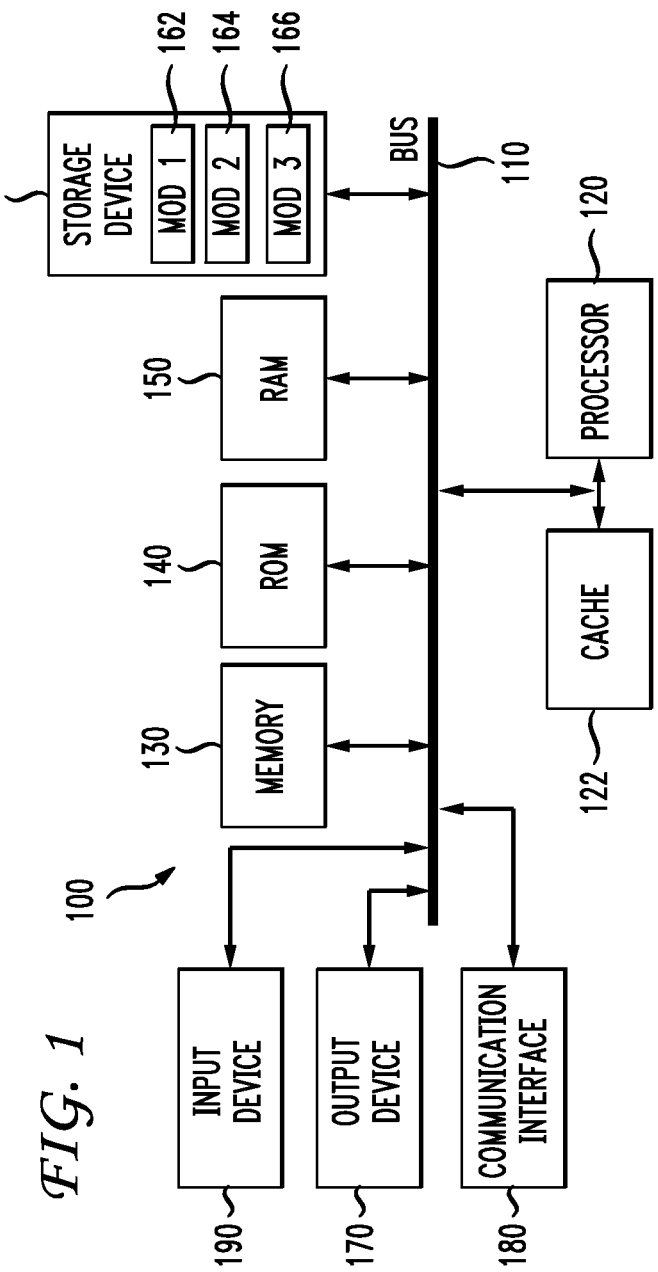
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
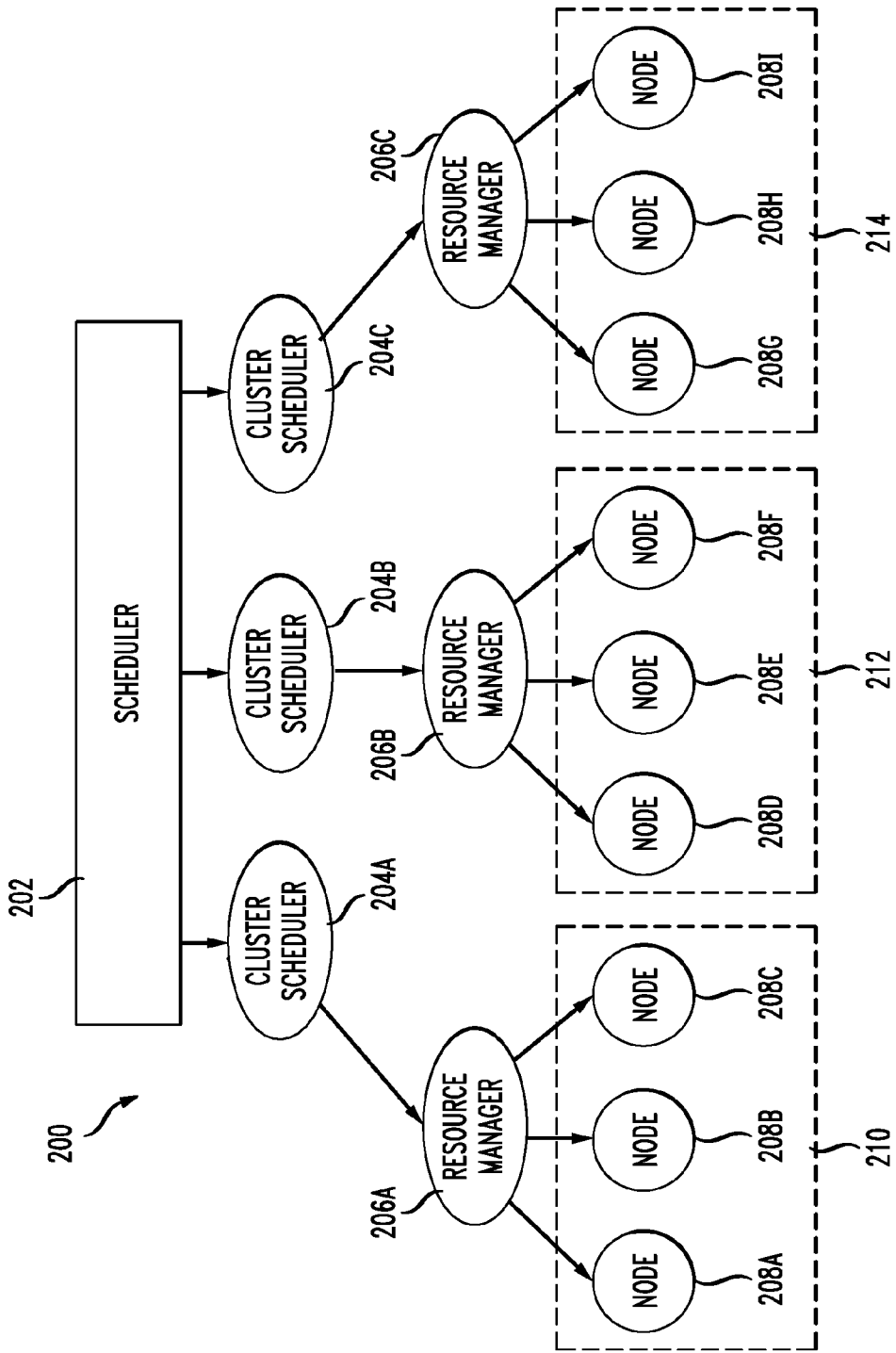
FIG. 2 illustrates an example grid scheduler system embodiment.

Having disclosed some components of a computing system, the disclosure now turns to FIG. 2, which illustrates an exemplary grid scheduler. A cluster or the "cloud" is generally defined as a collection of compute nodes organized for accomplishing a task or a set of tasks. In general, a grid will comprise a plurality of clusters as will be shown in FIG. 2. Several general challenges exist when attempting to maximize resources in a grid. First, there are typically multiple layers of grid and cluster schedulers. A grid 200 generally comprises a group of clusters or a group of networked computers. The definition of a grid is very flexible and may mean a number of different configurations of computers. The introduction here is meant to be general given the variety of configurations that are possible. A grid scheduler 202 communicates with a plurality of cluster schedulers 204A, 204B and 204C. Each of these cluster schedulers communicates with a respective resource manager 206A, 206B or 206C. Each resource manager communicates with a respective series of compute resources shown as nodes 208A, 208B, 208C in cluster 210, nodes 208D, 208E, 208F in cluster 212 and nodes 208G, 208H, 208I in cluster 214.

Local schedulers (which may refer to either the cluster schedulers 204 or the resource managers 206) are closer to the specific resources 208 and may not allow grid schedulers 202 direct access to the resources. The grid level scheduler 202 typically does not own or control the actual resources. Therefore, jobs are submitted from the high level grid-scheduler 202 to a local set of resources with no more permissions that then user would have. This reduces efficiencies and can render the reservation process more difficult.

The heterogeneous nature of the shared compute resources also causes a reduction in efficiency. Without dedicated access to a resource, the grid level scheduler 202 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management that takes into consideration the resources and their availability in the immediate present or in the future, ad infinitum. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 208A, 208B, 208C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment to the configuration of the cluster environment and also losses in efficiency with the fragmentation associated with meeting particular policies.

The concept of clusters can be applied to virtual machines and hypervisors such that virtual machines and hypervisors can run on the nodes in the cluster. Compute nodes can act as hypervisors with multiple virtual machines running on each compute node. Compute nodes can act as dedicated nodes that perform specific tasks such as creating virtual machines or compute nodes can perform various duties including creating virtual machines and hosting virtual machines that process work. Alternately, compute nodes can act as dedicated production nodes where virtual machine creation does not occur.

Figure 3:
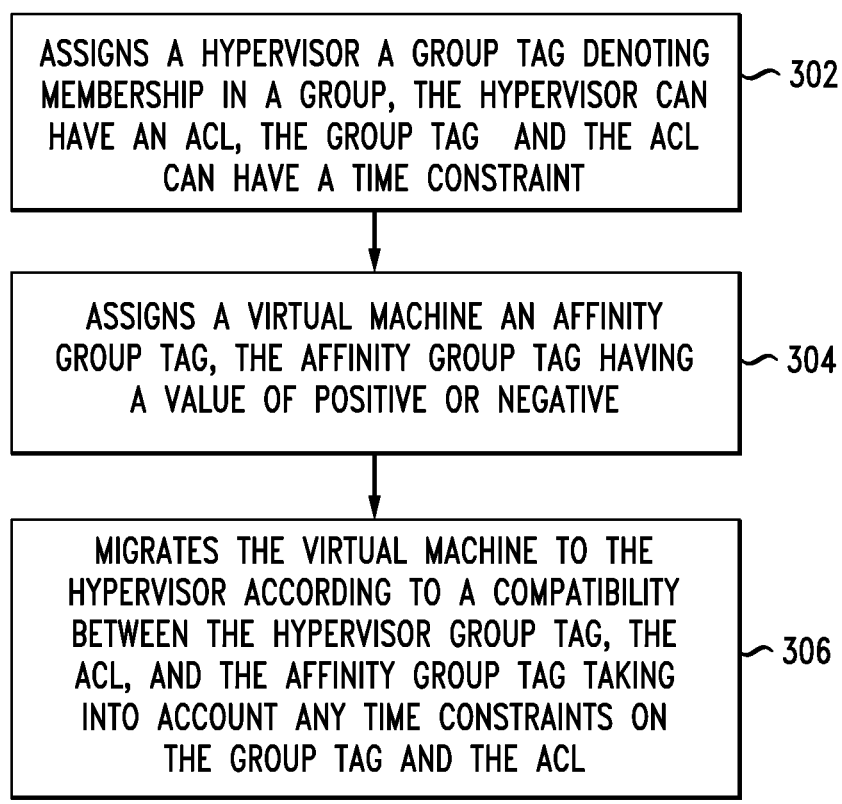
FIG. 3 illustrates constraining auto live migration using affinity group tags method embodiment.

Having disclosed some basic system components and concepts, the disclosure now turns to the exemplary method embodiment shown in FIG. 3. For the sake of clarity, the method is discussed in terms of an exemplary system as shown in FIG. 1 configured to practice the method. The steps outlined herein are exemplary and can be implemented in any combination thereof, including combinations that exclude, add, or modify certain steps.

FIG. 3 illustrates constraining auto live migration using affinity group tags method embodiment. Constraining auto live migration of virtual machines using group tags can be useful in many ways. For example, consider an organization wishing to reduce their operating system (OS) licensing costs. Some OS vendors charge customers per the number of hypervisors that are hosting virtual machines that are virtually using their OS. Keeping the number of hypervisors that are able to run virtual machines with this OS to a minimum will reduce the organization's licensing costs. Virtual machines that are running this OS should therefore only auto live migrate to the smaller group of hypervisors allowed for this particular OS. Migrating to other hypervisors is possible, but would increase the overall number of hypervisors hosting virtual machines with that OS, thus increasing licensing costs. Utilizing tags on hypervisors and virtual machines limits auto live migrations for virtual machines to approved hypervisors, which can keep licensing costs to a minimum.

A system assigns a hypervisor a group tag denoting membership in a group, the hypervisor can have an access control list (ACL), the group tag and the access control list (ACL) can have a time constraint (302). A group tag is a label specifying a group the hypervisor belongs to; multiple hypervisors with the same group tag are a part of the same group. Hypervisors can have any number of group tags and can belong to any number of groups or a system can constrain the number or type of group tags and groups that a particular hypervisors can belong to. For example, five hypervisors can host virtual machines running the Red Hat® Linux operating system, so each of the five hypervisors is assigned at least the group tag red_hat_linux. These hypervisors may belong to additional groups as well. A group tag can have a time constraint associated with it. Using the example above when a hypervisor is assigned the tag red_hat_linux, the system may also assign a time constraint making the tag only valid during a certain time period (example 7 am to 8 pm daily) or the system may assign the tag for a limited duration (example the group tag is valid for 2 hours). The system can also associate an access control list with the hypervisor and can associate a time constraint with the access control list.

Next, a system assigns a virtual machine an affinity group tag, the affinity tag can be positive or negative (304). The tag can also have a percentage associated with it such as a 60% positive parameter. The affinity can also depend on some external or internal factors. A virtual machine can be assigned a group tag at creation time, or at any other time thereafter and virtual machine group tags can be added and removed at any time. For example, virtual machines running the Red Hat® Linux operating system are given the tag red_hat_linux with a positive affinity, denoting that the virtual machines with the red_hat_linux tag must be placed on a hypervisor having a matching red_hat_linux group tag. The system migrates the virtual machine to the hypervisor according to a compatibility between the hypervisor group tag, the access control list (ACL), and the affinity group tag taking into account any time constraints on the group tag and the access control list (ACL) (306). It should be noted that virtual machines can also be assigned more than one group tag. It should also be noted that time constraints can have multiple times associated with them, for example a group tag may be valid from 3 am to 8 am and from 6 pm to 11 pm, Monday through Friday.

Figure 4:
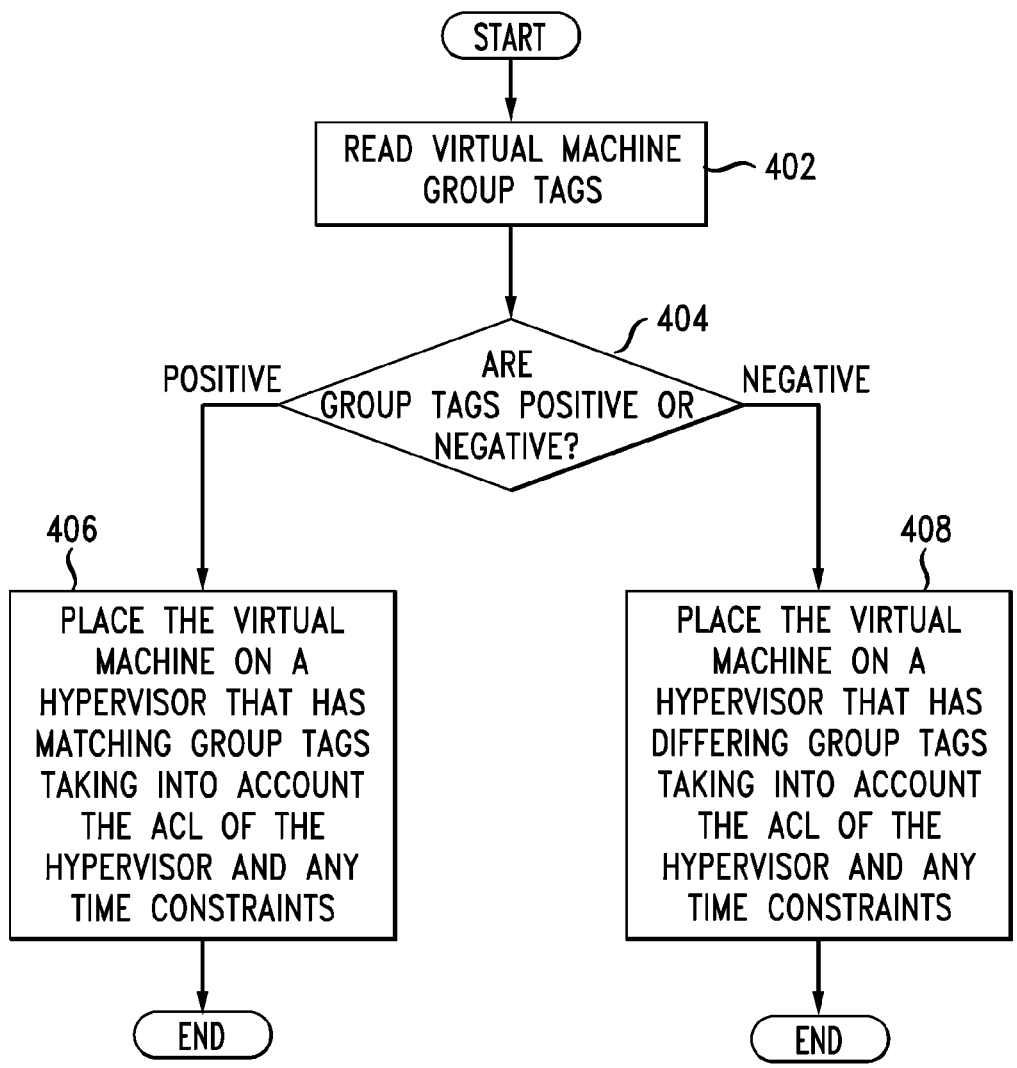
FIG. 4 illustrates positive and negative affinity group tags.

FIG. 4 illustrates positive and negative affinity group tags on virtual machines. A placement engine responsible for placing virtual machines on hypervisors and migrating between hypervisors can read virtual machine group tags (402) and determine if the group tag has a positive or negative affinity (404). If the virtual machine has a positive affinity group tag, the placement engine places the virtual machine on a hypervisor that has matching group tags taking into account the access control list (ACL) of the hypervisor and any time constraints (406). The hypervisor does not have to have an exact set of matching group tags, rather the hypervisor must have at least the group tags corresponding to the positive affinity group tags the virtual machine has. The matching group tags must be valid with respect to any time constraints that have been placed on the group tags and the affinity group tags. If the hypervisor has an access control list, then the virtual machine has to be allowed access by the access control list, taking into account any time constraint in the access control list, in order to place the virtual machine on the hypervisor. If the virtual machine has a negative affinity group tag, the placement engine places the virtual machine on a hypervisor having differing group tags taking into account the access control list (ACL) of the hypervisor and any time constraints (408). In this way, virtual machines are placed on compatible hypervisors regarding both positive and negative affinity group tags.

A system can add and delete affinity group tags on virtual machines, group tags and access control lists on hypervisors, and time constraints at any time during the life of the virtual machine or hypervisor, including at creation time. When the system adds or deletes a group tag, an affinity group tag, an access control list, or a time constraint that renders the hypervisor invalid for a virtual machine, it does not necessarily cause the virtual machine to be automatically moved. The placement engine or other process can automatically monitor group tags on virtual machines and hypervisors and make changes when necessary. For example, if a system removes a group tag assigned to a hypervisor, the placement engine can move virtual machines having the removed group tag to hypervisors having the corresponding group tag on a time basis, for instance every two hours or each day.

Although group tags are intended to limit placement of virtual machines to particular hypervisors, there are situations where limitations must be overcome. Limitations of virtual machine placement and live migration due to group tags can be overridden in the system, by forced migrations triggered by a human, a qualifying event in the placement engine or any other method determined by the system. For example, although a particular hypervisor may not belong to the group red_hat_linux there may be a time when a human determines the hypervisor is eligible to host virtual machines having the red_hat_linux group tag, perhaps when there is an urgent computationally intensive task to perform and additional resources are needed. Other limitations can be added to the group membership of a hypervisor, for instance a time dimension. A system can assign a hypervisor group membership of a particular group for one hour or for one week, such that the hypervisor can host virtual machines of a particular group for a limited time.

In addition to time limitations, reservation access control lists can be used to enforce auto live migration and placement. An access control list specifies which users or processes are granted access to objects and what operations are allowed on objects. For example, an executable computer program can contain an access control list allowing user Bob to execute the program. A reservation access control list is comprised of a list of objects or credentials that have access to the reservation. For example, a reservation access control list can define what users, groups, accounts, projects, or specific workload can access the resources covered by the reservation. A virtual machine created by a certain group, for example could be excluded from a reservations over a set of hypervisors, regardless of the virtual machine's group tagging.

Figure 5:
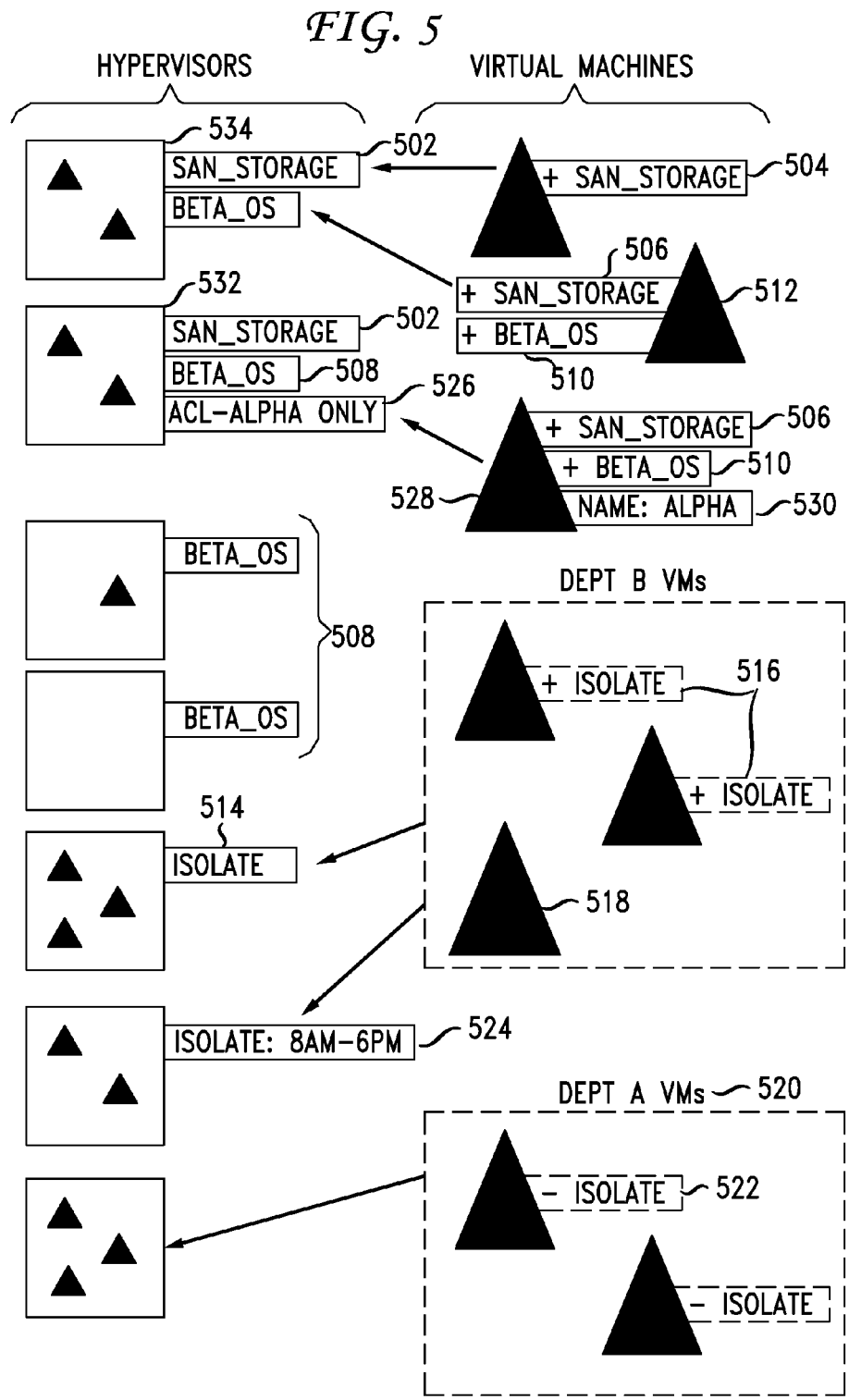
FIG. 5 illustrates an example migration utilizing group tags system embodiment.

FIG. 5 illustrates an example virtual machine migration utilizing group tags system embodiment. An example will illustrate virtual machine migration utilizing positive affinity group tags. A subset of hypervisors has access to special FibreChannel SAN storage. Virtual machines requiring this SAN storage must not be auto migrated to a hypervisor without this SAN storage, because doing so will result in an error and application failure. Virtual machines requiring SAN storage must be migrated only among the hypervisors that have SAN storage access. Utilizing the method described herein, all hypervisors having SAN storage can be tagged with the group tag "san_storage" 502. All virtual machines requiring SAN storage must likewise be marked with a positive affinity tag of "san_storage" 504, 506. These virtual machines will then only be created on the hypervisors having the "san_storage" group tag 502. When the virtual machines are auto live migrated by the placement engine, the engine will only consider hypervisors with "san_storage" tagging as potential target hosts. Automating the process of restricting virtual machines to a subset of available hypervisors increases efficiency because it removes the human element from manually moving a virtual machine to the appropriate hypervisor. The system can automatically determine based on load balancing, when and where to move a virtual machine.

Another example will illustrate virtual machine migration utilizing group tags. Due to operating system (OS) licensing costs an organization wishes to limit the number of hypervisors able to run virtual machines having the OS installed. The Acme organization determines how many hypervisors they would like to use in order to minimize licensing costs. Initially, the organization wishes to include two hypervisors, tagged with the "beta_os" tag 508, making them part of the same group. Virtual machines that run the beta OS will now require the "beta_os" tag 510 in order to be restricted to the two hypervisors, tagged with the "beta_os" tag 508. Auto live migrations of "beta_os" virtual machines 510 will only occur between the two hypervisors. A few weeks later, Acme decides they need more hypervisors to run the beta OS in order to meet an increase in demand. They tag five more hypervisors with "beta_os", now totaling seven. The placement engine then realizes more hypervisors are available and auto live migrates existing "beta_os" virtual machines to the newly added hypervisors in order to balance load. Acme has beta OS virtual machines that also require SAN storage 512. These virtual machines can be set to have positive affinity tags for "san_storage" and "beta_os" 506, 510. These virtual machines will now only be placed or auto live migrated to hypervisors with both the "san_storage" and "beta_os" tags 502.

An example will illustrate virtual machine migration utilizing group tags and access control lists. The Acme organization, from the last example, has a hypervisor 532 that they have decided to allow only virtual machines named Alpha 526. This hypervisor has SAN storage access designated by the "san_storage" tag 502, and also is licensed to operate the beta OS designated by the "beta_os" tag 508. Virtual machine 528 has positive affinity tags for "san_storage" and "beta_os" 506, 510 and has been named "Alpha" 530. The placement engine will be able to place virtual machine 528 on any hypervisor that has both the "san_storage" and "beta_os" tags 502, 508 as long as there is either no access control list or the virtual machine is allowed in the access control list. The placement engine will be able to place virtual machine 528 on hypervisor 532 or hypervisor 534 but the placement engine will only be able to place virtual machine 512 on hypervisor 534 and not hypervisor 532 because virtual machine 512 lacks the name "Alpha" 530 which is required by the access control list (ACL) 526 associated with hypervisor 532.

An example will illustrate virtual machine migration utilizing negative affinity group tags as well as time constraints. A number of hypervisors are shared between two departments, Department A and Department B. Department A has no restrictions on where its virtual machines can be hosted, however Department B has a set of virtual machines that cannot run on any hypervisors that also host other departments' virtual machines. These virtual machines must remain isolated on their hypervisors even if they are to be live migrated. Department B needs significant access during business hours of 8am to 6 pm but Department A needs access to the hypervisors all the time. Department B can set aside hypervisors for running their virtual machines that require isolation, tagged with isolate 514. Some of these isolate tags 524 are given a time constraint to only be active from 8am until 6 pm. All virtual machines from Department B requiring isolation should be given a positive affinity tag isolate 516 and will only be hosted on isolate hypervisors 514 or on isolate hypervisors 524 between 8am and 6 pm. Virtual machines from Department B without a tag 518 are free to run on the isolate hypervisors as well as non-isolate hypervisors. The placement engine cannot place or auto live migrate Department A virtual machines to any Department B hypervisors tagged with isolate 514 or with isolate 524 between 8am and 6 pm. Due to this fact, all Department A virtual machines 520 must have a negative affinity tag of "isolate" 522 to keep them away from isolated hypervisors. The placement engine can automatically monitor the time constraints on active tags on the hypervisors and can be set to auto live migrate Department B virtual machines with the isolate tag 516 away from hypervisors with an isolate tag 524 tag at 6 pm. This will allow Department A virtual machines to migrate to hypervisors that previously had an active isolate tag 524 but for which the time constraint has expired. The placement engine can then reverse the process at 8 am when the isolate tags 524 become active again.

Those of skill in the art will appreciate that other embodiments of the disclosure may include hypervisors that have one or more group tags without time constraints, one or more group tags with time constraints, a reservation access controls list which lists virtual machines that are always allowed or allowed for a time period or virtual machines that are never allowed or not allowed for a time period to be placed on the hypervisor as well as general allowance of all virtual machines or general disallowance of all virtual machines, or any of the many possible combinations of the above elements.

Utilizing group tags, time constraints, and access control lists on hypervisors and virtual machines allow the placement engine to automatically restrict virtual machines to certain hypervisors, which frees humans from the traditional method of manually moving each virtual machine when the need arises. Automating this process increases the efficiency of load balancing allowing more virtual machines to process work.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   assigning a hypervisor a group tag denoting membership in a group wherein the group tag has an associated time constraint;
   assigning a virtual machine an affinity group tag that denotes an initial placement requirement on hypervisors; and
   migrating the virtual machine to the hypervisor according to a compatibility between the group tag and the affinity group tag, the migrating causing the compatibility to exist for a specified period of time.

2. The method of claim 1, wherein the group tag assigned to the hypervisor is added and removed at any time.

3. The method of claim 1, wherein the affinity group tag is one of: (1) part of the virtual machine at initial creation and (2) added and removed after virtual machine creation.

4. The method of claim 1, wherein multiple hypervisors with a same group tag are part of a same group.

5. The method of claim 1, wherein assigning the virtual machine the affinity group tag renders the hypervisor invalid but does not cause the virtual machine to be automatically moved.

6. The method of claim 1, wherein limitations of virtual machine placement and live migration due to group tags are overridden in a system.

7. The method of claim 6, wherein the limitations are overridden by forced migrations triggered by one of a human and a qualifying event in a placement engine.

8. The method of claim 1, wherein reservation access control lists are used to enforce auto live migration and placement.

9. The method of claim 8, wherein a time dimension is added to at least one of the group tag of the hypervisor and the reservation access control lists.

10. The method of claim 1, wherein the affinity group tag is one of a positive affinity group tag and a negative affinity group tag.

11. A system comprising:
    a processor; and a memory storing instructions for controlling the processor to perform steps comprising:
        assigning a hypervisor, a group tag denoting membership in a group wherein the group tag has an associated time constraint;
        assigning a virtual machine an affinity group tag that denotes an initial placement requirement on hypervisors; and
        migrating the virtual machine to the hypervisor according to a compatibility between the group tag and the affinity group tag, the migrating causing the compatibility to exist for a specified period of time.

12. The system of claim 11, wherein the group tag assigned to the hypervisor is added and removed at any time.

13. The system of claim 11, wherein the affinity group tag is one of: (1) part of the virtual machine at initial creation and (2) added and removed after virtual machine creation.

14. The system of claim 11, wherein assigning the virtual machine the affinity group tag renders the hypervisor invalid but does not cause the virtual machine to be automatically moved.

15. The system of claim 11, wherein limitations of virtual machine placement and live migration due to group tags are overridden in a system.

16. The system of claim 11, wherein the affinity group tag is one of a positive affinity group tag and a negative affinity group tag.

17. A non-transitory computer-readable storage device storing instructions which, when executed by a computing device, cause the computing device to perform operations comprising:
    assigning a hypervisor, a group tag denoting membership in a group wherein the group tag has an associated time constraint;
    assigning a virtual machine an affinity group tag that denotes an initial placement requirement on hypervisors; and
    migrating the virtual machine to the hypervisor according to a compatibility between group tag and the affinity group tag, the migrating causing the compatibility to exist for a specified period of time.

18. The non-transitory computer-readable storage device of claim 17, wherein reservation access control lists are used to enforce auto live migration and placement.

19. The non-transitory computer-readable storage device of claim 18, wherein a time dimension is added to at least one of the group tag of the hypervisor and the reservation access control lists.

20. The non-transitory computer-readable storage device of claim 17, wherein the affinity group tag is one of a positive affinity group tag and a negative affinity group tag.

* * * * *